April 6, 1954 C. L. CURTET 2,674,158
SPECTACLES
Filed July 18, 1950
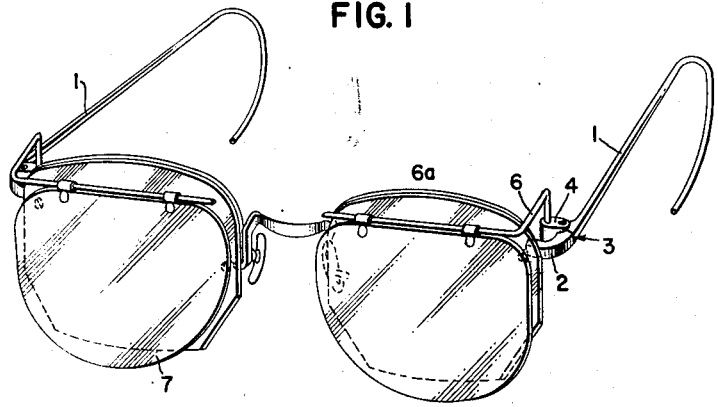
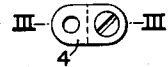
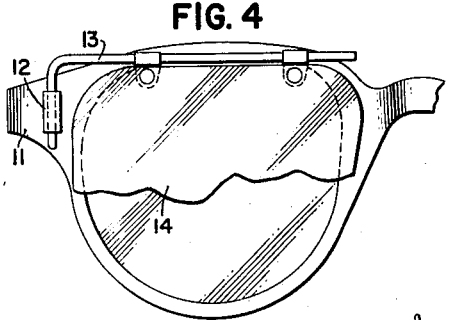
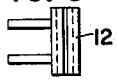
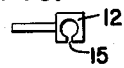
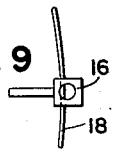
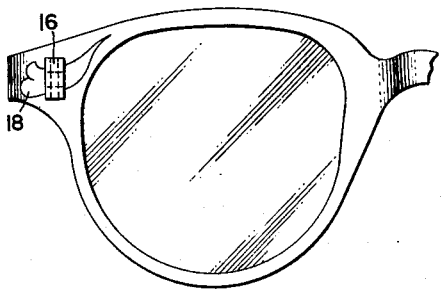
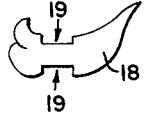
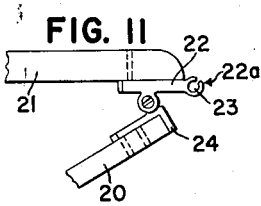
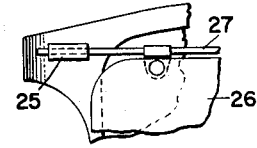
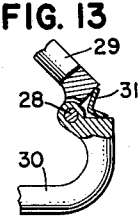
INVENTOR
CHARLES L. CURTET
BY
ATTORNEYS Patented Apr. 6, 1954

2,674,158

UNITED STATES PATENT OFFICE 2,674,158

SPECTACLES

Charles L. Curtet, St. Georges-Geneve, Switzerland

Application July 18, 1950, Serial No. 174,560

1 Claim. (Cl. 88—41)

The present invention relates to spectacles, and an object of the present invention is to improve the construction of spectacles.

Other objects of the present invention will appear in the course of the following specification.

Spectacles according to the present invention are characterized in that they comprise, in the neighbourhood of each main hinge, or one of them a hinge eye or socket adapted to receive the pintle of a supplementary eye-glass or eye-shade attachment constructed for hinge connection with the spectacles by way of the pintle and hinge eye.

The term "main hinges" is used herein to designate the hinges by which the side arms of the spectacle frame are connected to the face portion of such frame. The term "eye-glass" is used to describe transparency of glass, or plastic or other suitable material whether plane or of lens form and colored or not and including sun-glasses. The term "eye-shade" is used to describe a translucency or opacity of any suitable form. The term eye-piece is used in this specification to mean such an eye-glass or eye-shade. The eye-glass or eye-shade attachment includes a support forming the pintle.

Each hinge eye may be formed by a member having two lugs adapted to fit on either side of a main hinge and for the transverse of the pin of the said main hinge. The hole of one of the lugs may be tapped to receive a threaded portion of a screw which forms the said hinge pin.

According to another embodiment each main hinge is secured by two rivets having a common head and the head is longitudinally apertured to form the hinge eye.

Each hinge eye may be formed by a sleeve which is open at both ends. The sleeve may be longitudinally slotted so as to exert an elastic gripping action on the pintle of the attachment.

According to another embodiment the aforesaid common rivet head has on its portion facing the spectacles frame a recess communicating with the hinge eye and a leaf spring is gripped between the frame and the head of the rivets and is located in said recess so as to produce a frictional restraint on a pintle fitting in the hinge eye.

According to yet another embodiment, each hinge eye is formed in an extension of a plate of a main hinge.

The eye-piece attachment is provided with a pintle for co-operating with one of the hinge eyes of the spectacles.

The aforesaid hinge eyes may be arranged with their axes parallel to one another in a plane behind and substantially parallel to the general plane of the face portion of the frame in which case the attachment preferably comprises a bent bar, one end limb of which forms the pintle and another limb of which is hingedly connected to the eye-piece so that the latter can be swung to or away from a position in front of the spectacle lens about axes at right angles to one another to form a top or sideflap.

According to another embodiment the hinge eyes are arranged substantially in line so that the common axis extends along the upper portion of the face portion of the frame and, the attachment may then comprise a straight bar to which the upper portion of the eyepiece is fixed, one end of the bar projecting and forming the pintle for co-operating with one of the hinge eyes so that the eye-piece can be swung up from its normal position to form a topflap.

According to an alternative form of the invention the pintle or pintles is or are formed on the spectacles. In such case the hinge eye or eyes is or are formed on the supplementary eye glass or eye shade attachment.

A number of embodiments of the subject of the invention are shown by way of example in the accompanying drawings, in which:

Figure 1 is a view in perspective of spectacles having metal frames and fitted with the hinge eye members.

Figure 2 is a plan view of the hinge eye member.

Figure 3 is a section on the line III—III of Figure 2.

Figure 4 is a fragmentary elevational view of spectacles having a plastic frame fitted with hinge eye members.

Figure 5 is a profile view of the hinge eye member of Figure 4.

Figure 6 is a plan view of this member.

Figure 7 is a fragmentary elevational view of spectacles having a plastic frame and fitted with a variant arrangement of the hinge eye member.

Figure 8 is a profile view of the hinge eye member of Figure 7.

Figure 9 is a plan view of such member.

Figure 10 is an elevational view of a detail of Figure 7.

Figure 11 is a plan view of a further hinge eye arrangement.

Figure 12 is a fragmentary elevational view of spectacles having a plastic frame and a modified disposition of the eye member relative to that shown in Figure 6.

Figure 13 is a plan view, partly in section, of a detail of metal framed spectacles.

In Figure 1, the side arms 1 of the spectacles frame are each pivotally connected to the face portion 2 of the frame by a main hinge 3, the hinge pin of which has a screw-threaded portion. A metal hinge eye member 4 is secured to each by means of two holed lugs 4a and 4b, integral with the hinge eye member. The distance between these holes corresponds to the height of the hinge, so that they can be fitted on either side thereof. The screw pin 5 of the hinge extends through these holes, the head of the said screw being countersunk in the hole 4a, while the threaded portion thereof engages in the tapped portion of the hole 4b. Each of the hinge eye members 4 is adapted to receive a pintle formed by one end of a member of a bar 6 of the auxiliary lens or eye-shade attachment, the bar being constituted of three integrally formed members. The first member of the bar (Fig. 1) extends upwardly toward the top of the eye-piece, the second member is turned at around 90° to the first and when rotated as shown in Figure 1 protrudes forwardly of the eye-piece. The third member 6a of the bar 6 is turned at approximately 90° to the second member and when rotated (Fig. 1) is adjacent the outer surface of the eye-piece at the top. The third member 6a serves as a hinge pin for the eye-piece 7 which may be tinted glass or a lens coacting with the eye-piece. This attachment can thus turn about the axis of the hinge eye member 4 pintle hinge fashion so that the eye-piece serves as a side flap or may be hinged upwardly about the limb 6a of the bar 6.

The distance between the lugs 4a and 4b may be made slightly greater than the height of the hinge 3, so that the tightening of the screw 5 causes a very slight deformation of the hinge eye member 4, and frictional restraint of the pintle 6 in the hinge eye member is thus promoted.

In Figure 4, the two rivets securing the plate to the face portion 11 have a common head 12 in which is formed a longitudinal hole serving as the hinge eye for the pintle of a bar 13 to which is secured the eye-piece 14. The head 12 is longitudinally slotted at 15 in order to enable it to exert an elastic gripping action on the pintle.

In Figure 7, the hinge eye member 16 also forms a common head for the two hinge-securing rivets. A recess 17 is formed in this head 16, namely, in the part thereof facing the frame. This recess communicates with the longitudinal hole in the head. A leaf spring 18 is fitted between the frame and the head 16, and penetrates into the recess 17 so as to bear against the pintle of the eye-glass or eye-shade attachment and to produce a certain frictional restraint on the pintle. Two grooves 19 are formed in the leaf spring and co-operate with the head 16 to retain the spring in position. It is to be noted that the spring may be decoratively fashioned.

Figure 11 shows in plan view a fragment of a side 20 and of a face portion 21 of plastic spectacles, the main hinges of which have heel pieces. Thus one of the plates 22 of each hinge has an extension 22a in which is formed a hole 23 which constitutes the hinge eye, the wall of which is slotted in a similar manner to the rivet head 15 (Figure 6). This arrangement could be applied to the other plate 24 of each hinge.

These arrangements permit of very rapid fitting and removal of the eye-glass or eye-shade attachments. The end of the pintle of each attachment may be rounded to facilitate introduction thereof into the eye.

In Figure 12, a rivet head 25 similar to the head 12 of Figure 4 is disposed horizontally on the front portion of the spectacles frame. The eyepiece 26 is mounted on a rod 27 one end of which forms the pintle and can be swung up but not outwards.

Finally, Figure 13 shows the hinge 28 of a metal side arm 29 articulated to a face portion 30. A leaf spring 31, which may be V-shaped, curved or or any other geometrical form is held in position by the screw of the main hinge, with the ends of the spring under tension against the outer edges of the arm and the connected end of the face portion in the open position of the arm to maintain the side arm automatically in its retracted position.

It is apparent that the examples shown above have been given solely by way of illustration and not by way of limitation and that they are capable of different variations and modifications.

What is claimed:

Spectacles comprising a frame, a single vision eye-glass for said side of the frame, a side arm for each end of the frame, a hinge eye member for pivotally securing one end of each side arm to one end of the frame, each hinge eye member having a protuberance formed thereon on the side of the eye-glass, the protuberance having a substantially vertically directed opening formed therein, a bar rotatably mounted in the opening, the bar comprising three integrally formed sections, one section extending upwardly from the protuberance substantially to the top of the adjacent eye-glass, the second section being turned at an angle to the first mentioned section and extending forwardly of the eye-glass, the third section being turned at an angle to the second mentioned section in spaced relationship with the eye-glass, and extending parallel to the upper edge thereof, and an auxiliary lens coacting with the eye-glass hingedly secured to the third mentioned section.

References Cited in the file of this patent

UNITED STATES PATENTS

| Number | Name | Date |
|---|---|---|
| 648,165 | Fallardeau | Apr. 24, 1900 |
| 767,617 | Wells | Aug. 16, 1904 |
| 1,206,457 | Mills | Nov. 28, 1916 |
| 1,942,298 | Le Doux | Jan. 2, 1936 |

UNITED STATES PATENTS

| Number | Country | Date |
|---|---|---|
| 335,345 | Great Britain | Sept. 25, 1930 |